(12) United States Patent
Maruyama

(10) Patent No.: US 9,242,643 B2
(45) Date of Patent: Jan. 26, 2016

(54) CONTROL APPARATUS FOR A HYBRID VEHICLE DRIVE SYSTEM

(71) Applicant: TOYOTA JIDOSHA KABUSHIKI KAISHA, Toyota-shi, Aichi (JP)

(72) Inventor: Tomoyuki Maruyama, Taijimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/621,976

(22) Filed: Feb. 13, 2015

(65) Prior Publication Data

US 2015/0239465 A1 Aug. 27, 2015

(30) Foreign Application Priority Data

Feb. 24, 2014 (JP) .................................. 2014-033137

(51) Int. Cl.
| | |
|---|---|
| *B60W 20/00* | (2006.01) |
| *B60W 10/00* | (2006.01) |
| *B60W 50/00* | (2006.01) |
| *B60K 6/445* | (2007.10) |

(52) U.S. Cl.
CPC ................ *B60W 20/20* (2013.01); *B60K 6/445* (2013.01); *B60W 20/30* (2013.01); *Y10S 903/945* (2013.01)

(58) Field of Classification Search
USPC ........................................................ 701/22
See application file for complete search history.

(56) References Cited

U.S. PATENT DOCUMENTS

| | | | | |
|---|---|---|---|---|
| 8,554,400 B2 * | 10/2013 | Ichioka | ................... | B60K 6/445 318/139 |
| 9,085,299 B2 * | 7/2015 | Takahashi | .............. | B60K 6/445 |
| 9,108,630 B2 * | 8/2015 | Maruyama | ............. | B60K 6/445 |
| 9,120,482 B2 * | 9/2015 | Kobayashi | ............... | B60K 6/48 |
| 2006/0207813 A1 * | 9/2006 | Ishikawa | ................... | B60K 6/28 180/65.235 |
| 2006/0247086 A1 * | 11/2006 | Watanabe | .............. | B60K 6/365 475/208 |
| 2013/0282213 A1 | 10/2013 | Park | | |
| 2015/0057861 A1 * | 2/2015 | Nakajima | ....... | B60W 30/18027 701/22 |
| 2015/0073635 A1 * | 3/2015 | Takahashi | .............. | B60K 6/445 701/22 |
| 2015/0088350 A1 * | 3/2015 | Tamachi | ................ | B60K 6/445 701/22 |
| 2015/0094188 A1 * | 4/2015 | Kiyokami | .............. | B60K 6/445 477/3 |
| 2015/0105954 A1 * | 4/2015 | Maruyama | ............. | B60K 6/445 701/22 |

FOREIGN PATENT DOCUMENTS

JP 2013-224133 A 10/2013

* cited by examiner

*Primary Examiner* — Yonel Beaulieu
(74) *Attorney, Agent, or Firm* — Oliff PLC

(57) ABSTRACT

A control apparatus for a hybrid vehicle drive system includes: a differential device including first and second differential mechanisms and four rotary components; and an engine, first and second electric motors, and an output rotary member respectively connected to said four rotary components. One of said four rotary components is constituted by a rotary element of said first differential mechanism and a rotary element of said second differential mechanism selectively connected to each other through a clutch, while one of said rotary elements of said first and second differential mechanisms is selectively connected to a stationary member through a brake. The control apparatus includes a drive mode switching control portion for switching the hybrid vehicle drive system to one of at least two hybrid drive modes according to a selected one of different combinations of operating states of said clutch and said brake.

5 Claims, 9 Drawing Sheets

|      | CL2 | BK2 |
|------|-----|-----|
| HV1  |     | ○   |
| HV2  | ○   |     |
| EV1  |     | ○   |
| EV2  | ○   | ○   |

CONTROL APPARATUS FOR A HYBRID VEHICLE DRIVE SYSTEM

CROSS REFERENCE TO RELATED APPLICATION

The present application claims the priority from Japanese Patent Application No. 2014-033137 filed on Feb. 24, 2014, the disclosure of which is herein incorporated by reference in its entirety.

BACKGROUND OF THE INVENTION

1. Field of the Invention

The present invention relates to an improvement of a control apparatus for a drive system of a hybrid vehicle.

2. Description of Related Art

There is known a hybrid vehicle drive system including: a differential device which comprises a first differential mechanism and a second differential mechanism and which comprises four rotary components; an engine, a first electric motor, a second electric motor and an output rotary member which are respectively connected to said four rotary components; and a plurality of coupling elements. JP-2013-224133 A1 discloses an example of a hybrid vehicle transmission system configured to switch the hybrid vehicle drive system to a selected one of a plurality of vehicle drive modes, according to a selected one of different combinations of operating states of the coupling elements.

It is known that the hybrid vehicle drive system constructed as described above has a so-called "mechanical locking point" at which an amount of an electric energy transmitted through an electric path between the first and second electric motors is minimal as a result of zeroing of an operating speed of the first or second electric motor. At this mechanical locking point, a transmission efficiency of the hybrid vehicle drive system has a maximal value. However, the prior art control apparatus for the hybrid vehicle drive system is not configured to implement a vehicle drive mode switching control while taking account of the mechanical locking point, so that the transmission efficiency cannot be effectively improved. This problem was first discovered by the present inventor in a process of intensive studies in an effort to improve the performance of the hybrid vehicle.

SUMMARY OF THE INVENTION

The present invention was made in view of the background art described above. It is therefore an object of the present invention to provide a control apparatus for a hybrid vehicle drive system, which permits an effective improvement of the transmission efficiency of the hybrid vehicle drive system.

The object indicated above is achieved according to a first aspect of the present invention, which provides a control apparatus for a hybrid vehicle drive system including: a differential device which comprises a first differential mechanism and a second differential mechanism and which comprises four rotary components; and an engine, a first electric motor, a second electric motor and an output rotary member which are respectively connected to the above-described four rotary components, and wherein one of the above-described four rotary components is constituted by a rotary element of the above-described first differential mechanism and a rotary element of the above-described second differential mechanism which are selectively connected to each other through a clutch, while one of the above-described rotary elements of the above-described first and second differential mechanisms is selectively connected to a stationary member through a brake, the above-described control apparatus comprising a drive mode switching control portion for switching the hybrid vehicle drive system to a selected one of at least two hybrid drive modes according to a selected one of respective different combinations of operating states of the above-described clutch and the above-described brake, the above-described control apparatus controlling the above-described hybrid vehicle drive system such that a transmission efficiency of the hybrid vehicle drive system which varies with a change of its speed ratio has a maximal value at a first speed ratio value and a second speed ratio value, in one of the above-described at least two hybrid drive modes, and at a third speed ratio value intermediate between the above-described first and second speed ratio values, in the other of the above-described at least two hybrid drive modes, the above-described drive mode switching control portion being configured to switch the above-described hybrid vehicle drive system to a selected one of the above-described at least two hybrid drive modes on the basis of a predetermined control parameter such that the above-described two hybrid drive modes are selectively established as the above-described predetermined control parameter is increased.

In the first aspect of the invention described above, the control apparatus controls the hybrid vehicle drive system such that the transmission efficiency of the hybrid vehicle drive system which varies with a change of its speed ratio has the maximal value at the first and second speed ratio values, in one of the at least two hybrid drive modes, and at the third speed ratio value intermediate between the first and second speed ratio values, in the other of the at least two hybrid drive modes, and the drive mode switching control portion is configured to switch the hybrid vehicle drive system to the selected one of the two hybrid drive modes on the basis of the predetermined control parameter such that the two hybrid drive modes are selectively established as the predetermined control parameter is increased. According to this first aspect of the invention, the hybrid vehicle drive system has a relatively large number of mechanical locking points during the increase of the predetermined control parameter. Namely, the present invention provides a control apparatus for a hybrid vehicle drive system, which control apparatus permits an effective or significant improvement of the transmission efficiency of the hybrid vehicle drive system.

In a second aspect of the invention, the control apparatus according to the first aspect of the invention is configured such that the above-described drive mode switching control portion alternately establishes the above-indicated two hybrid drive modes as one of a required vehicle drive force and an output speed of the hybrid vehicle drive system is increased as the above-indicated predetermined control parameter while the other of the required vehicle drive force and the output speed is held constant. According to this second aspect of the invention, the hybrid vehicle drive system has a relatively large number of mechanical locking points during the increase of one of the two control parameters in the form of the required vehicle drive force and the output speed which can be practically used to switch the drive system between the two hybrid drive modes, so that the transmission efficiency of the drive system can be effectively or significantly improved.

In a third aspect of the invention, the hybrid vehicle drive system to be controlled by the control apparatus according to the first or second aspect of the invention is configured such that relative rotating speeds of the above-described four rotary components are represented by a collinear chart in which a vertical line representing a rotating speed of the rotary component fixed to the above-described first electric motor, and a vertical line representing a rotating speed of the rotary component fixed to the above-described second electric motor are located at respective opposite ends of the collinear chart in a direction perpendicular to the above-indicated vertical lines. According to this third aspect of the invention, the hybrid vehicle drive system which has a practical arrangement has a relatively large number of mechanical locking points while the hybrid vehicle drive system is alternately switched between the two hybrid drive modes, so that the transmission efficiency of the drive system can be effectively or significantly improved.

In the hybrid vehicle drive system to be controlled by the control apparatus of a fourth aspect of the invention according to any one of the first through third aspects of the invention, the transmission efficiency has the above-indicated maximal value when an operating speed of the above-described first electric motor or the above-described second electric motor is zero. According to this fourth aspect of the invention, the hybrid vehicle drive system has a relatively large number of mechanical locking points while the hybrid vehicle drive system is alternately switched between the two hybrid drive modes, so that the transmission efficiency of the drive system can be effectively or significantly improved.

In the hybrid vehicle drive system to be controlled by the control apparatus of a fifth aspect of the invention according to any one of the first through fourth aspects of the invention, the above-described first differential mechanism comprises a first rotary element connected to the above-described first electric motor, a second rotary element connected to the above-described engine, and a third rotary element, while the above-described second differential mechanism comprises a first rotary element, a second rotary element and a third rotary element. Further, the third rotary element of the above-described first differential mechanism and the third rotary element of the above-described second differential mechanism are fixed to each other, and the second rotary element of the above-described second differential mechanism is fixed to the above-described output rotary member, while the third rotary element of the above-described second differential mechanism is fixed to the above-described second electric motor. Further, the above-described clutch selectively connects the second rotary element of the above-described first differential mechanism and the first rotary element of the above-described second differential mechanism, while the above-described brake selectively fixes the first rotary element of the above-described second differential mechanism to the above-described stationary member. According to this fifth aspect of the invention, the hybrid vehicle drive system which has a practical arrangement has a relatively large number of mechanical locking points while the hybrid vehicle drive system is alternately switched between the two hybrid drive modes, so that the transmission efficiency of the drive system can be effectively or significantly improved.

DETAILED DESCRIPTION OF PREFERRED EMBODIMENTS

Figure 1:
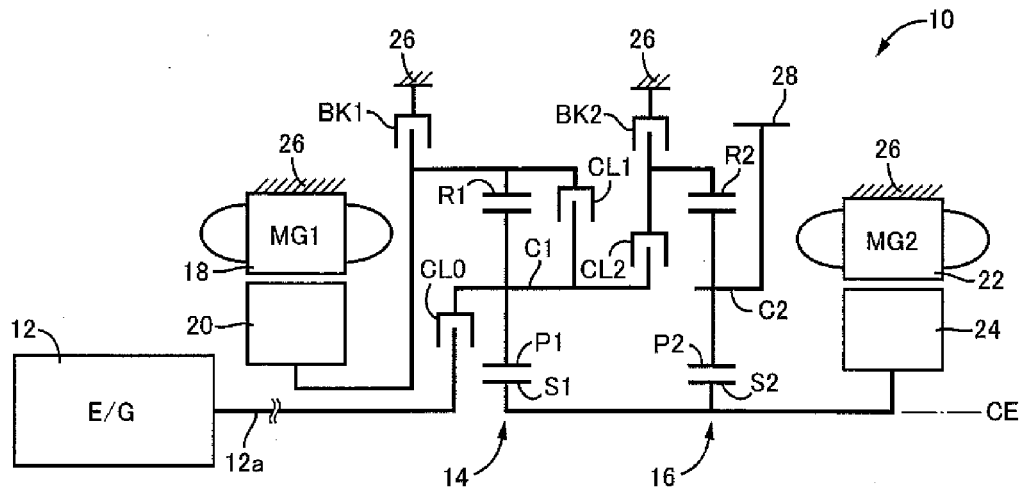
FIG. 1 is a schematic view showing an arrangement of a hybrid vehicle drive system to which the present invention is suitably applicable.

In the hybrid vehicle drive system to be controlled by the control apparatus according to the present invention, the differential device comprising the first differential mechanism and the second differential mechanism comprises the four rotary components when the above-described clutch disposed between a rotary element of the first differential mechanism and a rotary element of the second differential mechanisms is placed in an engaged state. Preferably, the differential device comprises the four rotary components when the clutch disposed between the second rotary element of the first differential mechanism and the first rotary element of the second differential mechanism is placed in the engaged state.

The hybrid vehicle drive system to be controlled by the control apparatus of the present invention is switched between two hybrid drive modes by a so-called "clutch-to-clutch" control, more specifically, by concurrently performed engaging and releasing actions or releasing and engaging actions of the above-described clutch and the above-described brake.

Referring to the drawings, preferred embodiments of the present invention will be described in detail. It is to be understood that the drawings referred to below do not necessarily accurately represent ratios of dimensions of various elements.

EMBODIMENTS

FIG. 1 is the schematic view showing an arrangement of a hybrid vehicle drive system 10 (hereinafter referred to simply as a "drive system 10") to which the present invention is suitably applicable. As shown in FIG. 1, the drive system 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common axis CE. In the following description of the embodiments, the direction of extension of this axis CE will be referred to as an "axial direction". The drive system 10 is constructed substantially symmetrically with respect to the axis CE. In FIG. 1, a lower half of the drive system 10 is not shown. This applies to the other figures showing the other embodiments.

The engine 12 is an internal combustion engine such as a gasoline engine, which is operable to generate a drive force by combustion of a fuel such as a gasoline injected into its cylinders. Each of the first and second electric motors MG1 and MG2 is a so-called motor/generator having a function of a motor operable to generate a drive force, and a function of an electric generator operable to generate a reaction force, and is provided with a stator 18, 22 fixed to a stationary member in the form of a housing (casing) 26, and a rotor 20, 24 disposed radially inwardly of the stator 18, 22.

The first planetary gear set 14 is a single-pinion type planetary gear set which has a gear ratio ρ1 and which includes rotary elements consisting of a first rotary element in the form of a ring gear R1; a second rotary element in the form of a carrier C1 supporting a pinion gear P1 such that the pinion gear P1 is rotatable about its axis and the axis of the planetary gear set; and a third rotary element in the form of a sun gear S1 meshing with the ring gear R1 through the pinion gear P1. The second planetary gear set 16 is a single-pinion type planetary gear set which has a gear ratio ρ2 and which includes rotary elements consisting of a first rotary element in the form of a ring gear R2; a second rotary element in the form of a carrier C2 supporting a pinion gear P2 such that the pinion gear P2 is rotatable about its axis and the axis of the planetary gear set; and a third rotary element in the form of a sun gear S2 meshing with the ring gear R2 through the pinion gear P2.

In the first planetary gear set 14, the ring gear R1 is fixed to the rotor 20 of the first electric motor MG1, and the carrier C1 is selectively connectable through a clutch CL0 to an output shaft of the engine 12 in the form of a crankshaft 12a, while the sun gear S1 is fixed to the sun gear S2 of the second planetary gear set 16 and the rotor 24 of the second electric motor MG2. In the second planetary gear set 16, the carrier C2 is fixed to an output rotary member in the form of an output gear 28. A drive force received by the output gear 28 is transmitted to a pair of right and left drive wheels (not shown) through a differential gear device and axles (not shown). A torque received by the drive wheels from a roadway surface during running of the hybrid vehicle is transmitted from the output gear 28 to the drive system 10 through the differential gear device and axles.

The clutch CL0 for selectively connecting and disconnecting the carrier C1 of the first planetary gear set 14 to and from the crankshaft 12a of the engine 12 is disposed between the crankshaft 12a and the carrier C1. A clutch CL1 for selectively connecting and disconnecting the carrier C1 to and from the ring gear R1 is disposed between the carrier C1 and the ring gear R1. A clutch CL2 for selectively connecting and disconnecting the carrier C1 to and from the ring gear R2 of the second planetary gear set 16 is disposed between the carrier C1 and the ring gear R2. A brake BK1 for selectively fixing the ring gear R1 to the stationary member in the form of the housing 26 is disposed between the ring gear R1 and the housing 26. A brake BK2 for selectively fixing the ring gear R2 to the housing 26 is disposed between the ring gear R2 and the housing 26.

In the present embodiment, the clutch CL2 serves as a clutch configured to selectively connect the second rotary element of the first planetary gear set 14 in the form of the carrier C1 and the first rotary element of the second planetary gear set 16 in the form of the ring gear R2, while the brake BK2 serves as a brake configured to selectively fix the ring gear R2 of the second planetary gear set 16 (connectable to the carrier C1 through the clutch CL2) to the stationary member in the form of the housing 26. The drive system 10 need not be provided with the clutch CL0. That is, in the absence of the clutch CL0, the crankshaft 12a of the engine 12 may be directly fixed to the carrier C1 of the first planetary gear set 14, or indirectly through a damper, for instance. Further, the drive system 10 need not be provided with the clutch CL1 and the brake BK1.

Each of the clutches CL0, CL1 and CL2 (hereinafter collectively referred to as "clutches CL" unless otherwise specified), and the brakes BK1 and BK2 (hereinafter collectively referred to as "brakes BK" unless otherwise specified) is preferably a hydraulically operated coupling device an operating state of which is controlled (which is engaged and released) according to a hydraulic pressure applied thereto from a hydraulic control unit 54. While wet multiple-disc type frictional coupling devices are preferably used as the clutches CL and brakes BK, meshing type coupling devices, namely, so-called dog clutches (claw clutches) may also be used. Alternatively, the clutches CL and brakes BK may be electromagnetic clutches, magnetic powder clutches and any other clutches the operating states of which are controlled (which are engaged and released) according to electric commands generated from an electronic control device 30.

Figure 2:
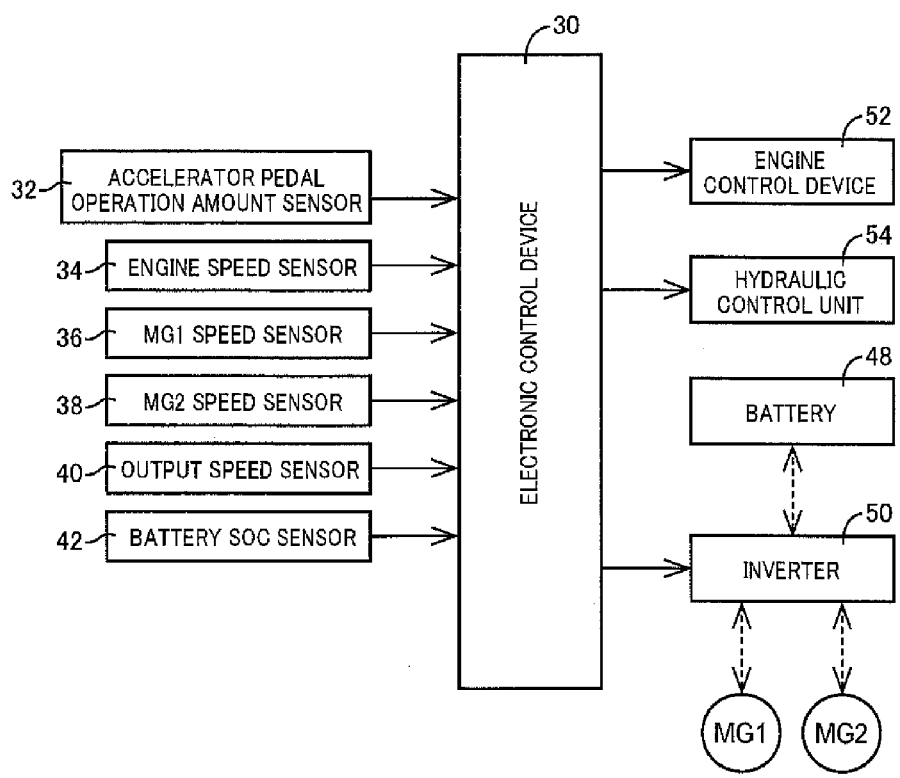
FIG. 2 is a block diagram illustrating major portions of a control system provided to control the drive system of FIG. 1.

FIG. 2 is the block diagram illustrating major portions of a control system provided to control the drive system 10. The electronic control device 30 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive system 10, such as a drive control of the engine 12 and hybrid drive controls of the first and second electric motors MG1 and MG2. In the present embodiment, the electronic control device 30 serves as a control apparatus for the drive system 10. The electronic control device 30 may be constituted by mutually independent control units as needed for respective controls such as an output control of the engine 12 and drive controls of the first and second electric motors MG1 and MG2.

As indicated in FIG. 2, the electronic control device 30 is configured to receive various signals from sensors and switches provided in the drive system 10. Namely, the electronic control device 30 receives: an output signal of an accelerator pedal operation amount sensor 32 indicative of an operation amount or angle $A_{CC}$ of an accelerator pedal (not shown), which corresponds to a vehicle output required by a vehicle operator; an output signal of an engine speed sensor 34 indicative of an engine speed $N_E$, that is, an operating speed of the engine 12; an output signal of an MG1 speed sensor 36 indicative of an operating speed $N_{MG1}$ of the first electric motor MG1; an output signal of an MG2 speed sensor 38 indicative of an operating speed $N_{MG2}$ of the second electric motor MG2; an output signal of an output speed sensor 40 indicative of a rotating speed $N_{OUT}$ of the output gear 28, which corresponds to a running speed V of the hybrid vehicle; and an output signal of a battery SOC sensor 42 indicative of a stored electric energy amount (state of charge) SOC of a battery 48.

The electronic control device 30 is also configured to generate various control commands to be applied to various portions of the drive system 10. Namely, the electronic control device 30 applies, to an engine control device 52, engine output control commands for controlling the output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $\theta_{TH}$ of an electronic throttle valve. Further, the electronic control device 30 applies command signals to an inverter 50, for controlling operations of the first and second electric motors MG1 and MG2, so that the first and second electric motors MG1 and MG2 are operated with electric energies supplied thereto from the battery 48 through the inverter 50 according to the command signals to control outputs (output torques) of the electric motors MG1 and MG2. Electric energies generated by the first and second electric motors MG1 and MG2 are supplied to and stored in the battery 48 through the inverter 50. Further, the electronic control device 30 applies command signals for controlling the operating states of the clutches CL and brakes BK, to linear solenoid valves and other electromagnetic control valves provided in the hydraulic control unit 54, so that hydraulic pressures generated by those electromagnetic control valves are controlled to control the operating states of the clutches CL and brakes BK.

An operating state of the drive system 10 is controlled through the first and second electric motors MG1 and MG2, such that the drive system 10 functions as an electrically controlled differential portion whose difference of input and output speeds is controllable. For example, an electric energy generated by the first electric motor MG1 is supplied to the battery 48 or the second electric motor MG2 through the inverter 50. Namely, a major portion of the drive force of the engine 12 is mechanically transmitted to the output gear 28, while the remaining portion of the drive force is consumed by the first electric motor MG1 operating as the electric generator, and converted into the electric energy, which is supplied to the second electric motor MG2 through the inverter 50, so that the second electric motor MG2 is operated to generate a drive force to be transmitted to the output gear 28. Components associated with the generation of the electric energy and the consumption of the generated electric energy by the second electric motor MG2 constitute an electric path through which a portion of the drive force of the engine 12 is converted into an electric energy which is converted into a mechanical energy.

Figures 3, 4:
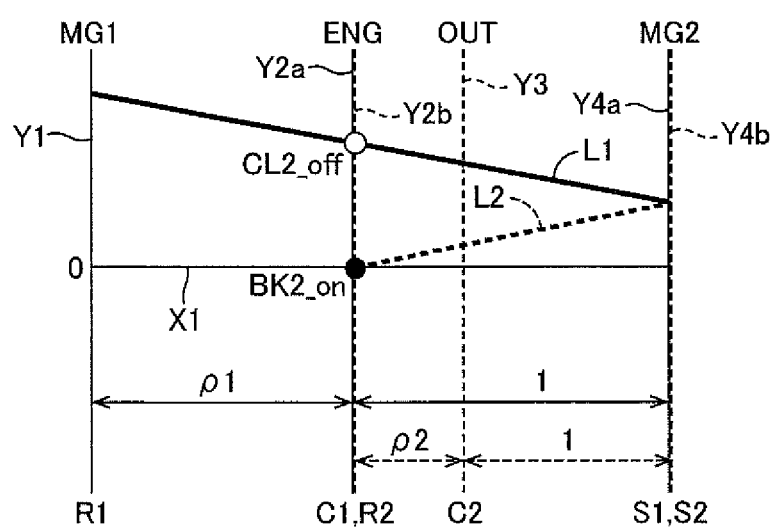
FIG. 3 is a table indicating combinations of operating states of a clutch and a brake, which correspond to respective four vehicle drive modes to be established in the drive system of FIG. 1.
FIG. 4 is a collinear chart having straight lines which permit indication thereon of relative rotating speeds of various rotary elements of the drive system of FIG. 1, the collinear chart corresponding to drive modes HV1 and EV1 indicated in FIG. 3.

In the hybrid vehicle provided with the drive system 10 constructed as described above, a selected one of a plurality of vehicle drive modes is established according to operating states of the engine 12 and the first and second electric motors MG1 and MG2, and the operating states of the clutches CL and brakes BK. FIG. 3 is the table indicating combinations of the operating states of the clutch CL2 and brake BK2, which correspond to the respective four vehicle drive modes of the drive system 10. In this table, "o" marks represent the engaged states of the clutch CL2 and brake BK2 while blanks represent their released states. Drive modes EV1 and EV2 indicated in FIG. 3 are EV drive modes in which the engine 12 is held at rest while at least one of the first and second electric motors MG1 and MG2 is used as a vehicle drive power source. Drive modes HV1 and HV2 are hybrid drive modes in which the engine 12 is operated as the vehicle drive power source while the first and second electric motors MG1 and MG2 are operated as needed to generate a vehicle drive force and/or an electric energy. Namely, the drive modes HV1 and HV2 in this embodiment are two hybrid drive modes which are selectively established according to respective combinations of the operating states of the clutch CL2 and the brake BK2. In these hybrid drive modes, at least one of the first and second electric motors MG1 and MG2 can be operated to generate a reaction force or placed in a non-loaded free state.

As indicated in FIG. 3, the drive system 10 is placed in the hybrid drive mode HV1 in the engaged state of the brake BK2 and in the released state of the clutch CL2, and placed in the hybrid drive mode HV2 in the released state of the brake BK2 and in the engaged state of the clutch CL2. That is, the drive system 10 is switched between the two hybrid drive modes HV1 and HV2 by a so-called "clutch-to-clutch" control, more specifically, by concurrently performed engaging and releasing actions or releasing and engaging actions of the clutch CL2 and the brake BK2. Further, the drive system 10 is placed in the EV drive mode EV1 in the engaged state of the brake BK2 and in the released state of the clutch CL2, and placed in the EV drive mode EV2 in the engaged states of both of the clutch CL2 and brake BK2.

While the drive system 10 in the present embodiment is placed in one of the four different drive modes as indicated in FIG. 3, the drive system 10 may be configured to be placed in a selected one of a plurality of constant-speed-ratio drive modes, according to a selected one of different combinations of the operating states of the clutch CL1 and the brake BK1, for instance. In the constant-speed-ratio drive modes, the drive system 10 has respective different speed values of a speed ratio of a power transmitting path from the engine 12 to the output gear 28. While drive mode switching control to switch the drive system 10 between the hybrid drive modes HV1 and HV2 in the present embodiment will be described, the principle of this invention is equally applicable to a switching control to switch the drive system 10 from the hybrid drive mode HV1 or HV2 to the EV drive mode EV1 or EV2, or to one of the above-indicated constant-speed-ratio drive modes.

The clutch CL1 and the brake BK1 provided in the drive system 10 are placed in the engaged or released state as needed depending upon a running state of the hybrid vehicle provided with the drive system 10. The following description of the plurality of drive modes corresponding to the respective combinations of the operating states of the clutch CL2 and brake BK2, as indicated in FIG. 3, is based on an assumption that the clutch CL1 and brake BK1 are both placed in the released states.

Figure 5:
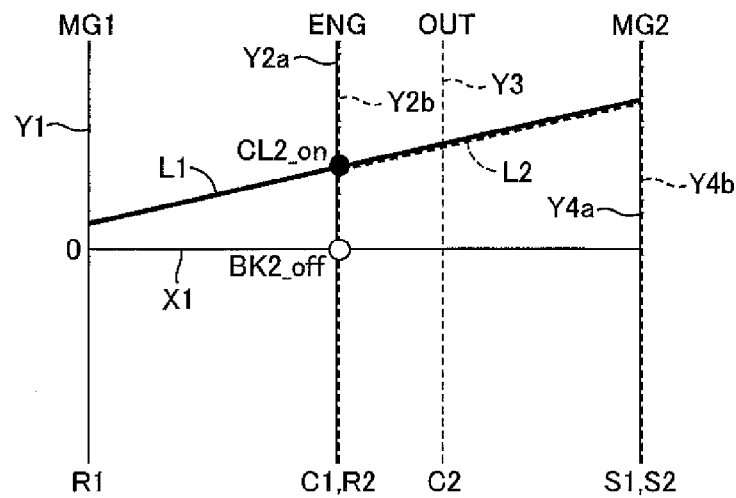
FIG. 5 is a collinear chart having straight lines which permit indication thereon of the relative rotating speeds of the rotary elements of the drive system of FIG. 1, the collinear chart corresponding to a drive mode HV2 indicated in FIG. 3.
Figure 6:
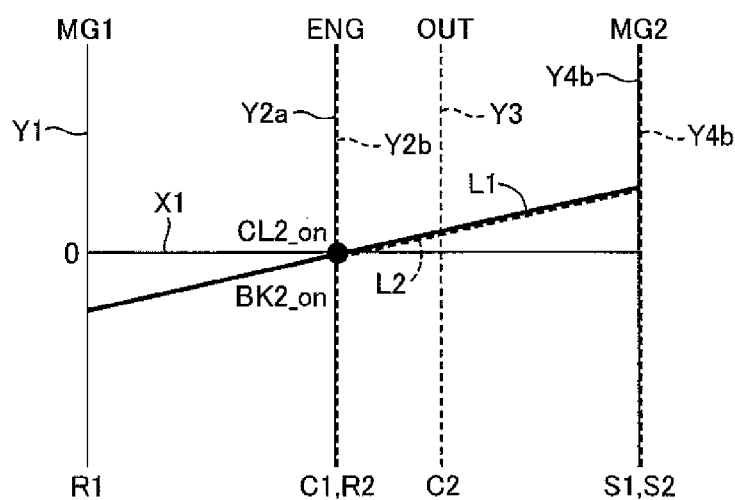
FIG. 6 is a collinear chart having straight lines which permit indication thereon of the relative rotating speeds of the rotary elements of the drive system of FIG. 1, the collinear chart corresponding to a drive mode EV2 indicated in FIG. 3.

FIGS. 4-6 are the collinear charts having straight lines which permit indication thereon of relative rotating speeds of the various rotary components of the drive system 10 (rotary elements of the first and second planetary gear sets 14 and 16), in respective different states of connection of the rotary elements corresponding to the respective different combinations of the operating states of the clutch CL2 and brake BK2. These collinear charts are defined in a two-dimensional coordinate system having a horizontal axis along which relative gear ratios ρ of the first and second planetary gear sets 14 and 16 are taken, and a vertical axis along which the relative rotating speeds of the rotary elements are taken. The collinear charts indicate the relative rotating speeds when the output gear 28 is rotated in the positive direction to drive the hybrid vehicle in the forward direction. A horizontal line X1 represents the rotating speed of zero, while vertical lines Y1, Y2a, Y2b, Y3, Y4a and Y4b arranged in the order of description in the rightward direction represent the respective relative rotating speeds of the various rotary elements. Namely, a solid line Y1 represents the rotating speed of the ring gear R1 of the first planetary gear set 14 (first electric motor MG1), and a solid line Y2a represents the rotating speed of the carrier C1 of the first planetary gear set 14 (engine 12), while a broken line Y2b represents the rotating speed of the ring gear R2 of the second planetary gear set 16. A broken line Y3 represents the rotating speed of the carrier C2 of the second planetary gear set 16 (output gear 28), and a solid line Y4a represents the rotating speed of the sun gear S1 of the first planetary gear set 14, while a broken line Y4b represents the rotating speed of the sun gear S2 of the second planetary gear set 16 (second electric motor MG2). In FIGS. 4-6, the vertical lines Y2a and Y2b are superimposed on each other, while the vertical lines Y4a and Y4b are superimposed on each other. Since the sun gears S1 and S2 are fixed to each other, the relative rotating speeds of the sun gears S1 and S2 represented by the vertical lines Y4a and Y4b are equal to each other.

In the hybrid vehicle drive system 10, the relative rotating speeds of the four rotary components are represented by the collinear charts of FIGS. 4-6 in which the vertical line Y1 representing the rotating speed of the rotary component (ring gear R1) fixed to the first electric motor MG1, and the vertical line Y4 (vertical lines Y4a and Y4b) representing the rotating speed of the rotary component (sun gears S1 and S2) fixed to the second electric motor MG2 are located at respective opposite ends of each collinear chart in a direction perpendicular to the above-indicated vertical lines.

In FIGS. 4-6, a solid line L1 represents the relative rotating speeds of the three rotary elements of the first planetary gear set 14, while a broken line L2 represents the relative rotating speeds of the three rotary elements of the second planetary gear set 16. Distances between the vertical lines Y1-Y4 (Y2b-Y4b) are determined by the gear ratios ρ1 and ρ2 of the first and second planetary gear sets 14 and 16. Described more specifically, regarding the vertical lines Y1, Y2a and Y4a corresponding to the respective three rotary elements of the first planetary gear set 14, a distance between the vertical lines Y2a and Y4a respectively corresponding to the carrier C1 and the sun gear S1 corresponds to "1", while a distance between the vertical lines Y1 and Y2a respectively corresponding to the ring gear R1 and the carrier C1 corresponds to the gear ratio "ρ1". Regarding the vertical lines Y2b, Y3 and Y4b corresponding to the respective three rotary elements of the second planetary gear set 16, a distance between the vertical lines Y3 and Y4b respective corresponding to the carrier C2 and the sun gear S2 corresponds to "1", while a distance between the vertical lines Y2b and Y3 respectively corresponding to the ring gear R2 and the carrier C2 corresponds to the gear ratio "ρ2". The drive modes of the drive system 10 will be described by reference to FIGS. 4-6.

The collinear chart of FIG. 4 corresponds to the drive mode HV1 of the drive system 10, which is preferably the hybrid drive mode in which the engine 12 is used as the vehicle drive power source while the first and second electric motors MG1 and MG2 are operated to generate a drive force and/or an electric energy as needed. Described by reference to this collinear chart of FIG. 4, the carrier C1 of the first planetary gear set 14 and the ring gear R2 of the second planetary gear set 16 are rotatable relative to each other in the released state of the clutch CL2. In the engaged state of the brake BK2, the ring gear R2 of the second planetary gear set 16 is fixed to the stationary member in the form of the housing 26, so that the rotating speed of the ring gear R2 is held zero. In this drive mode HV1, the engine 12 is operated to generate an output torque by which the output gear 28 is rotated. At this time, the first electric motor MG1 is operated to generate a reaction torque in the first planetary gear set 14, so that the output of the engine 12 can be transmitted to the output gear 28. In the second planetary gear set 16, the carrier C2, that is, the output gear 28 is rotated in the positive direction by a positive torque (i.e., torque in a positive direction) generated by the second electric motor MG2 in the engaged state of the brake BK2.

The collinear chart of FIG. 5 corresponds to the drive mode HV2 of the drive system 10, which is preferably the hybrid drive mode in which the engine 12 is used as the vehicle drive power source while the first and second electric motors MG1 and MG2 are operated as needed to generate a vehicle drive force and/or an electric energy. Described by reference to this collinear chart of FIG. 5, the carrier C1 of the first planetary gear set 14 and the ring gear R2 of the second planetary gear set 16 are not rotatable relative to each other, in the engaged state of the clutch CL2, that is, the carrier C1 and the ring gear R2 are integrally rotated as a single rotary component in the engaged state of the clutch CL2. The sun gears S1 and S2, which are fixed to each other, are integrally rotated as a single rotary component. Namely, in the drive mode HV2 of the drive system 10, the first and second planetary gear sets 14 and 16 function as a differential device comprising a total of four rotary components. That is, the drive mode HV2 is a composite split mode in which the four rotary components are connected to each other in the order of description in the rightward direction as seen in FIG. 5. The four rotary components consist of the ring gear R1 (fixed to the first electric motor MG1); a rotary member consisting of the carrier C1 and the ring gear R2 connected to each other (and connected to the engine 12); the carrier C2 (fixed to the output gear 28); and a rotary member consisting of the sun gears S1 and S2 connected to each other (and fixed to the second electric motor MG2).

In the drive mode HV2, the carrier C1 of the first planetary gear set 14 and the ring gear R2 of the second planetary gear set 16 are connected to each other in the engaged state of the clutch CL2, so that the carrier C1 and the ring gear R2 are rotated integrally with each other. Accordingly, either one or both of the first and second electric motors MG1 and MG2 can receive a reaction force corresponding to the output of the engine 12. Namely, one or both of the first and second electric motors MG1 and MG2 can be operated to receive the reaction force during an operation of the engine 12, and each of the first and second electric motors MG1 and MG2 can be operated at an operating point assuring a relatively high degree of operating efficiency, and/or with a reduced degree of torque limitation due to heat generation.

The collinear chart of FIG. 4 also corresponds to the drive mode EV1 of the drive system 10, which is preferably the EV drive mode in which the engine 12 is held at rest while the second electric motor MG2 is used as the vehicle drive power source. Described by reference to this collinear chart of FIG. 4, the carrier C1 of the first planetary gear set 14 and the ring gear R2 of the second planetary gear set 16 are rotatable relative to each other in the released state of the clutch CL2. Further, in the engaged state of the brake BK2, the ring gear R2 of the second planetary gear set 16 is fixed to the stationary member in the form of the housing 26, so that the rotating speed of the ring gear R2 is held zero. In this drive mode EV1, the carrier C2, that is, the output gear 28 is rotated in the positive direction by a positive torque (i.e., torque in a positive direction) generated by the second electric motor MG2 in the second planetary gear set 16. Namely, the hybrid vehicle provided with the drive system 10 can be driven in the forward direction with the positive torque generated by the second electric motor MG2. In this case, the first electric motor MG1 is preferably held in a free state.

The collinear chart of FIG. 6 corresponds to the drive mode EV2 of the drive system 10, which is preferably the EV drive mode in which the engine 12 is held at rest while at least one of the first and second electric motors MG1 and MG2 is used as the vehicle drive power source. Described by reference to this collinear chart of FIG. 6, the carrier C1 of the first planetary gear set 14 and the ring gear R2 of the second planetary gear set 16 are not rotatable relative to each other in the engaged state of the clutch CL2. Further, in the engaged state of the brake BK2, the ring gear R2 of the second planetary gear set 16 and the carrier C1 of the first planetary gear set 14 which is connected to the ring gear R2, are fixed to the stationary member in the form of the housing 26, so that the rotating speeds of the ring gear R2 and the carrier C1 are held zero. In this drive mode EV2, the rotating directions of the ring gear R1 and the sun gear S1 of the first planetary gear set 14 are opposite to each other. Namely, the carrier C2, that is, the output gear 28 is rotated in the positive direction by a negative torque (acting in the negative direction) generated by the first electric motor MG1, and/or a positive torque (acting in the positive direction) generated by the second electric motor MG2. That is, the hybrid vehicle provided with the drive system 10 can be driven in the forward direction when the torque is generated by at least one of the first and second electric motors MG1 and MG2.

In the drive mode EV2, at least one of the first and second electric motors MG1 and MG2 may be operated as the electric generator. In this case, one or both of the first and second electric motors MG1 and MG2 may be operated to generate a vehicle drive force (torque), at an operating point assuring a relatively high degree of operating efficiency, and/or with a reduced degree of torque limitation due to heat generation. Further, at least one of the first and second electric motors MG1 and MG2 may be held in a free state, when the generation of an electric energy by a regenerative operation of the electric motors MG1 and MG2 is inhibited due to full charging of the battery 48. Namely, the drive mode EV2 can be established under various running conditions of the hybrid vehicle, or may be kept for a relatively long length of time. Accordingly, the drive mode EV2 is advantageously provided on a hybrid vehicle such as a plug-in hybrid vehicle, which is frequently placed in an EV drive mode.

Figure 7:
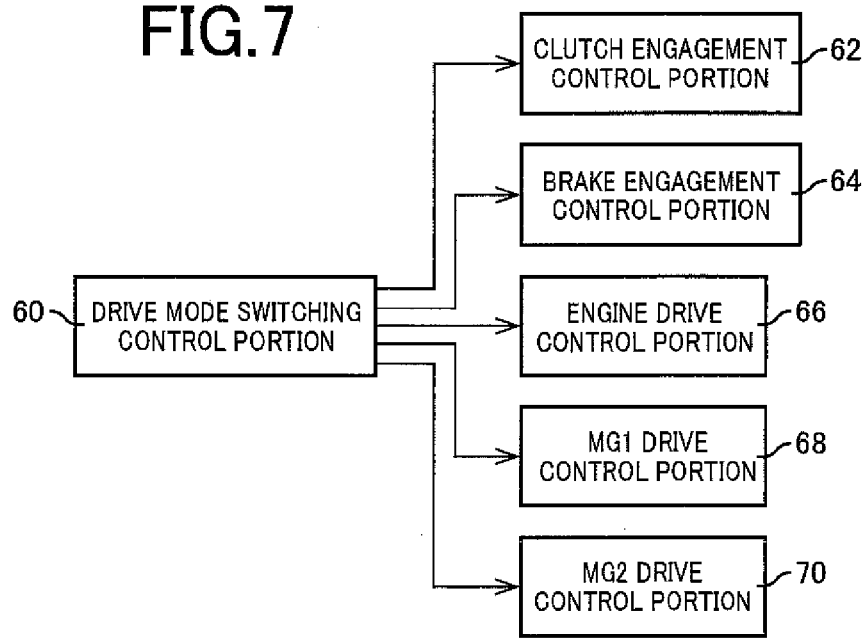
FIG. 7 is a functional block diagram illustrating major control functions of an electronic control device shown in FIG. 2.
Figure 9:
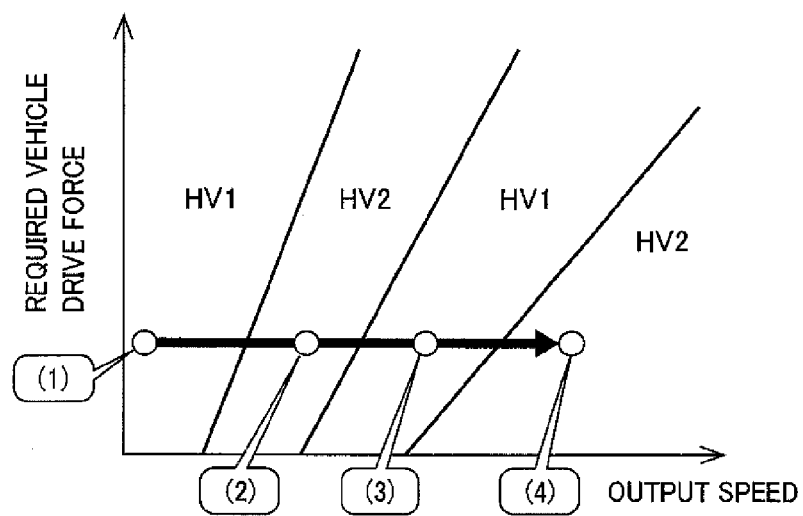
FIG. 9 is a view indicating an example of a drive mode switching map used by the electronic control device shown in FIG. 2, to switch the drive system between the two hybrid drive modes in a first embodiment of this invention, with an increase of an output speed of the drive system while a required vehicle drive force is kept constant, as indicated by a thick arrow-headed line.

FIG. 7 is the functional block diagram illustrating major control functions of the electronic control device 30. A drive mode switching control portion 60 shown in FIG. 7 is configured to determine the drive mode of the drive system 10 that should be established. Described more specifically, the drive mode switching control portion 60 selects one of the four drive modes indicated in FIG. 3, that is, the drive modes HV1, HV2, EV1 and EV2, on the basis of the accelerator pedal operation amount $A_{CC}$ detected by the accelerator pedal operation amount sensor 32 which corresponds to the required vehicle drive force, the vehicle running speed V corresponding to the output speed detected by the output speed sensor 40, the stored electric energy amount SOC of the battery 48 detected by the battery SOC sensor 42, etc., and according to a predetermined drive mode switching map as indicated in FIG. 9 referred to below.

A clutch engagement control portion 62 is configured to control the operating state of the clutch CL2 through the hydraulic control unit 54. Described more specifically, the clutch engagement control portion 62 controls an output hydraulic pressure of a solenoid control valve provided in the hydraulic control unit 54 to control the clutch CL2, for controlling hydraulic pressure $P_{CL2}$ which determines the operating state (torque capacity) of the clutch CL2. The clutch engagement control portion 62 is preferably configured to control the operating state of the clutch CL2, according to the drive mode selected by the drive mode switching control portion 60. Namely, the clutch engagement control portion 62 is basically configured to control the torque capacity of the clutch CL2, so as to place the clutch CL2 in the engaged state when the drive mode switching control portion 60 has determined that the drive system 10 should be switched to the drive mode HV2 or EV2, and so as to place the clutch CL2 in the released state when the drive mode switching control portion 60 has determined that the drive system 10 should be switched to the drive mode HV1 or EV1.

A brake engagement control portion 64 is configured to control the operating state of the brake BK2 through the hydraulic control unit 54. Described more specifically, the brake engagement control portion 64 controls an output hydraulic pressure of a solenoid control valve provided in the hydraulic control unit 54 to control the brake BK2, for controlling hydraulic pressure $P_{BK2}$ which determines the operating state (torque capacity) of the brake BK2. The brake engagement control portion 64 is preferably configured to control the torque capacity of the brake BK2, according to the drive mode selected by the drive mode switching control portion 60. Namely, the brake engagement control portion 64 is basically configured to control the torque capacity of the brake BK2, so as to place the brake BK2 in the engaged state when the drive mode switching control portion 60 has determined that the drive system 10 should be switched to the drive mode HV1, EV1 or EV2, and so as to place the brake BK2 in the released state when the drive mode switching control portion 60 has determined that the drive system 10 should be switched to the drive mode HV2.

An engine drive control portion 66 is configured to control an operation of the engine 12 through the engine control device 52. For instance, the engine drive control portion 66 commands the engine control device 52 to control an amount of supply of a fuel by the fuel injecting device of the engine 12 into an intake pipe, a timing of ignition (ignition timing) of the engine 12 by the igniting device, and the opening angle $\theta_{TH}$ of the electronic throttle valve, so that the engine 12 generates a required output, that is, a target torque (target engine output).

An MG1 drive control portion 68 is configured to control an operation of the first electric motor MG1 through the inverter 50. For example, the MG1 drive control portion 68 controls an amount of an electric energy to be supplied from the battery 48 to the first electric motor MG1 through the inverter 50, so that the first electric motor MG1 generates a required output, that is, a target torque (target MG1 output). An MG2 drive control portion 70 is configured to control an operation of the second electric motor MG2 through the inverter 50. For example, the MG2 drive control portion 70 controls an amount of an electric energy to be supplied from the battery 48 to the second electric motor MG2 through the inverter 50, so that the second electric motor MG2 generates a required output, that is, a target torque (target MG2 output).

In the hybrid drive modes in which the engine 12 is operated while the first and second electric motors MG1 and MG2 are used as the vehicle drive power source, a required vehicle drive force to be generated by the drive system 10 (output gear 28) is calculated on the basis of the accelerator pedal operation amount $A_{CC}$ detected by the accelerator pedal operation amount sensor 32, and the vehicle running speed V corresponding to the output speed $N_{OUT}$ detected by the output speed sensor 40. The operations of the first and second electric motors MG1 and MG2 are controlled by the MG1 and MG2 drive control portions 68 and 70, while the operation of the engine 12 is controlled by the engine drive control portion 66, so that the calculated required vehicle drive force is obtained by the output torque of the engine 12 and the output torques of the first and second electric motors MG1 and MG2.

Figure 8:
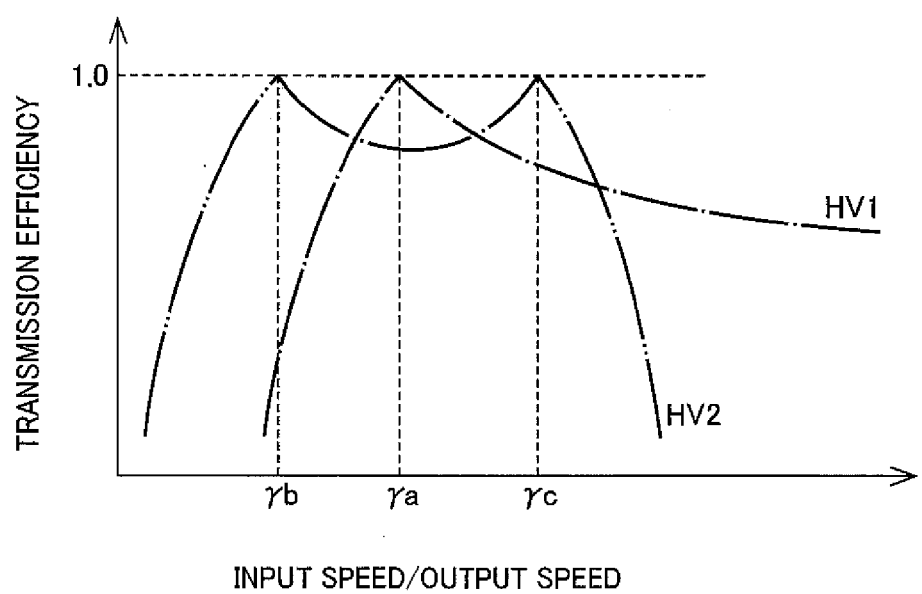
FIG. 8 is a view for explaining a transmission efficiency of the drive system of FIG. 1, wherein a speed ratio is taken along a horizontal axis while a theoretical transmission efficiency is taken along a vertical axis.

FIG. 8 is the view for explaining a transmission efficiency of the drive system 10, wherein a speed ratio of the drive system 10, that is, a ratio of the input speed (input shaft speed) to the output speed (output shaft speed), is taken along a horizontal axis while a theoretical transmission efficiency of the drive system 10 is taken along a vertical axis. The speed ratio taken along the horizontal axis is a ratio of the input speed of the differential device constituted by the first and second planetary gear sets 14 and 16, to the output speed of the differential device, that is, a speed reduction ratio of the differential device, which is a ratio of the rotating speed of an input rotary member such as the carrier C1 to the rotating speed of the output gear 28 (rotating speed of the carrier C2), for instance. The speed ratio (speed reduction ratio) increases in the rightward direction along the horizontal axis in FIG. 8, namely, in the direction from the highest-gear position side toward the lowest-gear position side. The transmission efficiency taken along the vertical axis in FIG. 8 is a theoretical value of the transmission efficiency of the drive system 10, and has a maximum value of 1.0 when an entire drive force received by the differential device (first and second planetary gear sets 14 and 16) is mechanically transmitted to the output gear 28, without transmission of an electric energy through the electric path.

In FIG. 8, a one-dot chain line represents the transmission efficiency when the drive system 10 is placed in the hybrid drive mode HV1, while a two-dot chain line represents the transmission efficiency when the drive system 10 is placed in the hybrid drive mode HV2. It will be understood that the transmission efficiency of the drive system 10 placed in the hybrid drive mode HV1 has a maximum value (maximal value) at the speed ratio γa. At this speed ratio γa of the drive system 10, the operating speed of the first electric motor MG1 (rotating speed of the ring gear R1) is zero, and an amount of an electric energy transmitted through the electric path due to a reaction force of the first electric motor MG1 is zero, so that the entire drive force can be mechanically transmitted from the engine 12 and the second electric motor MG2 to the output gear 28. This highest efficiency operating point at which the amount of the electric energy transmitted through the electric path is zero will be hereinafter referred to as a "mechanical locking point" (mechanically power transmitting point). The speed ratio γa is preferably lower than 1 which is the speed ratio on the overdrive position side.

It will also be understood that the transmission efficiency of the drive system 10 placed in the hybrid drive mode HV2 has a maximum value (maximal value) at speed ratios γb and γc, that is, the drive system 10 has the mechanical locking point at the speed ratios γb and γc, since the speed ratios ρ1 and ρ2 of the respective first and second planetary gear sets 14 and 16 are determined such that the vertical lines representing the operating speeds of the first and second electric motors MG1 and MG2 are spaced apart from each other in the direction of the horizontal axis in the collinear chart of FIG. 6 when the differential device has the four rotary components in the engaged state of the clutch CL2. That is, the drive system 10 placed in the hybrid drive mode HV2 has the mechanical locking point at the speed ratio γb at which the operating speed of the first electric motor MG1 is zero and the amount of the electric energy transmitted through the electric path due to a reaction force of the first electric motor MG1 is zero, and also at the speed ratio γc at which the operating speed of the second electric motor MG2 is zero and the amount of the electric energy transmitted through the electric path due to a reaction force of the second electric motor MG2 is zero.

As indicated in FIG. 8, the speed ratio γa at which the transmission efficiency in the hybrid drive mode HV1 has the maximum value (maximal value) is intermediate between the speed ratios γb and γc at which the transmission efficiency in the hybrid drive mode HV2 has the maximum value, that is, γb<γa<γc. In other words, the transmission efficiency of the drive system 10 which varies with a change of its speed ratio has the maximal value at a first speed ratio value of γb and a second speed ratio value of γc in one of the two hybrid drive modes HV1 and HV2, that is, in the hybrid drive mode HV2, and at a third speed ratio value of γa between the first and second speed ratio values of γb and γc, in the other hybrid drive mode HV1.

FIG. 9 is the view indicating an example of the drive mode switching map used by the drive mode switching control portion 60 according to a first embodiment of the invention to switch the drive system 10 between the two hybrid drive modes HV1 and HV2, on the basis of two control parameters in the form of the required drive force of the vehicle and the output speed of the drive system 10. This drive mode switching map is predetermined and stored in a suitable memory device. The drive mode switching control portion 60 switches the drive system 10 between the hybrid drive modes HV1 and HV2 on the basis of the required vehicle drive force and the output speed and according to the drive mode switching map indicated in FIG. 9. The required vehicle drive force is a target value of the drive force to be transmitted to the drive wheels of the hybrid vehicle provided with the drive system 10, that is, a value relating to the target vehicle drive force. For example, the required vehicle drive force is represented by the accelerator pedal operation amount $A_{CC}$ detected by the accelerator pedal operation amount sensor 32, or by the opening angle $\theta_{TH}$ of an electronic throttle valve not shown. On the other hand, the output speed is the rotating speed of the drive wheels of the hybrid vehicle, that is, a value relating to the running speed of the hybrid vehicle. For example, the output speed is represented by the vehicle running speed V detected by the output speed sensor 40 (by the rotating speed $N_{OUT}$ of the output gear 28).

According to the drive mode switching map indicated in FIG. 9, the drive mode switching control portion 60 alternately establishes or selects the two hybrid drive modes HV1 and HV2, with an increase of one of the two control parameters. Preferably, the drive mode switching control portion 60 alternately establishes the hybrid drive modes HV1 and HV2, as one of the required vehicle drive force and the output speed is increased while the other is held constant.

A thick arrow-headed line in FIG. 9 represents alternate changes of the vehicle drive mode between the hybrid drive modes HV1 and HV2, which changes take place with an increase of the output speed while the required vehicle drive force is held constant. Namely, the drive mode switching map is formulated to establish: the hybrid drive mode HV1 when a point indicating the running state of the hybrid vehicle represented by the required vehicle drive force and the output speed lies in a first region in which the output speed is lowest; the hybrid drive mode HV2 when the point lies in a second region in which the output speed is higher than in the first region; the hybrid drive mode HV1 when the point lies in a third region in which the output speed is higher than in the second region; and the hybrid drive mode HV2 when the point lies in a fourth region in which the output speed is highest, while the required vehicle drive force is held constant, as indicated by the thick arrow-headed line in FIG. 9. Thus, the drive system 10 is alternately switched between the two hybrid drive modes HV1 and HV2, in the order of HV1, HV2, HV1, HV2, as the output speed is increased from a value indicated at (1) toward a value indicated at (4), as indicated by the thick arrow-headed line in FIG. 9, while the required vehicle drive force is held constant.

FIGS. 11($a$)-11($h$) are the collinear charts at respective different points of time when the output speed is increased from the value indicated at (1) toward the value indicated at (4) while the required vehicle drive force is held constant, as indicated by the thick arrow-headed line in FIG. 9. Namely, FIGS. 11($a$)-11($h$) correspond to the respective different values of the output speed (rotating speed of the output gear 28) which are indicated by star marks. The drive system 10 is alternately switched between the two hybrid drive modes HV1 and HV2 as the output speed is increased from the value of FIG. 11($a$) toward the value of FIG. 11($h$). In the collinear charts of FIGS. 11($a$)-11($h$), the solid line L1 represents the relative rotating speeds of the three rotary elements of the first planetary gear set 14, while the broken line L2 represents the relative rotating speeds of the three rotary elements of the second planetary gear set 16, as in the collinear charts of FIGS. 4-6. Further, a thin one-dot chain line in each of FIGS. 11($a$)-11($h$) represent the rotating speeds of the rotary elements of the first and second planetary gear sets 14 and 16, if the drive system 10 was placed in one of the hybrid drive modes HV1 and HV2 which is not actually established according to the present embodiment, that is, if the drive system 10 was placed in the hybrid drive mode HV2 where the hybrid drive mode HV1 is actually established, or if the drive system 10 was placed in the hybrid drive mode HV1 where the hybrid drive mode HV2 is actually established. The solid and broken lines L1 and L2 and the thin one-dot chain lines in FIG. 13 are identical in their representation with those in FIGS. 11 ($a$)-11($h$).

Figure 10:
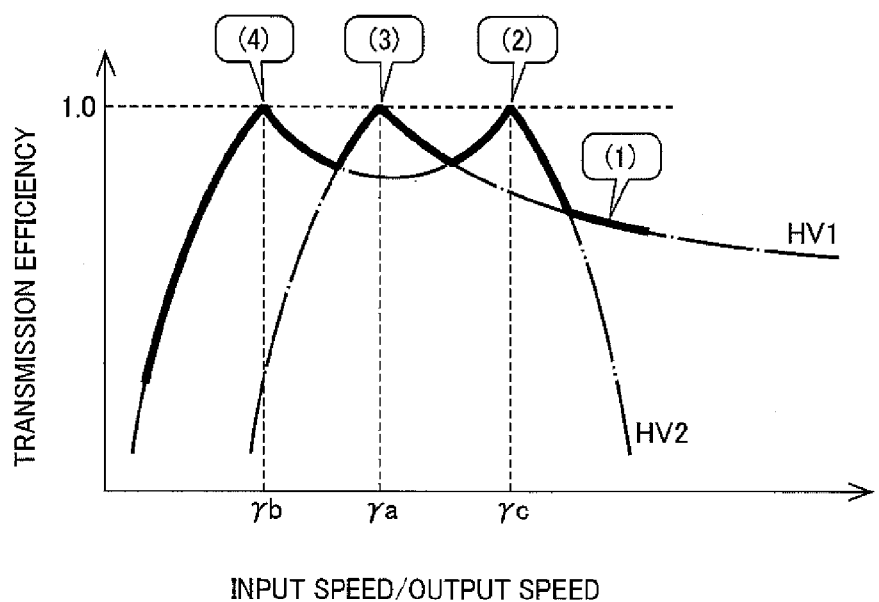
FIG. 10 is a view for explaining the transmission efficiency of the drive system of FIG. 1, indicating an example of a variation of the transmission efficiency with the increase of the output speed indicated in FIG. 9.
Figure 11A:
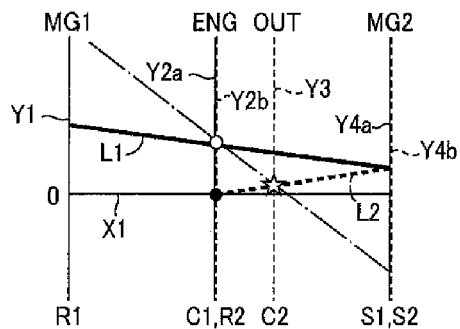
FIGS. 11(a)-11(h) are collinear charts at respective different points of time when the output speed is increased while the required vehicle drive force is held constant, as indicated by the thick arrow-headed line in FIG. 9.
Figure 11B:
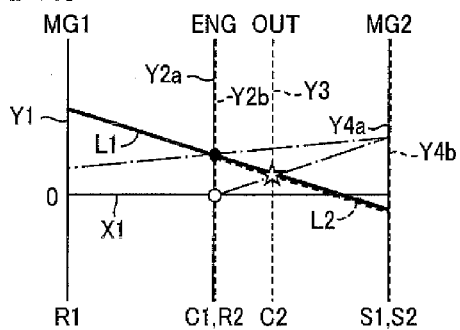
Figure 11C:
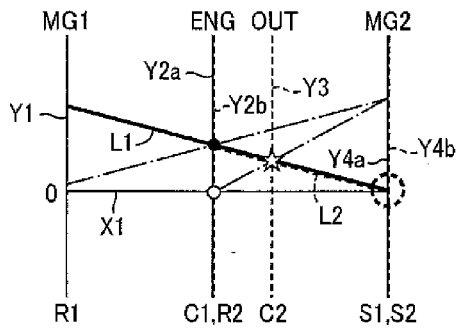
Figure 11D:
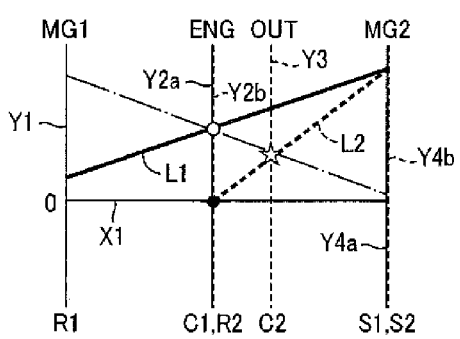
Figure 11E:
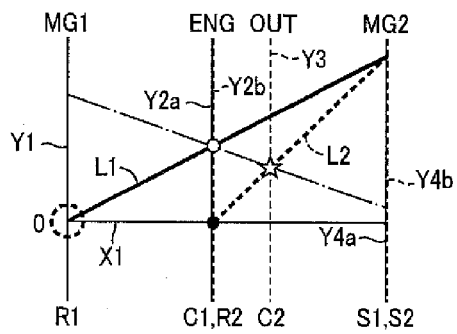
Figure 11F:
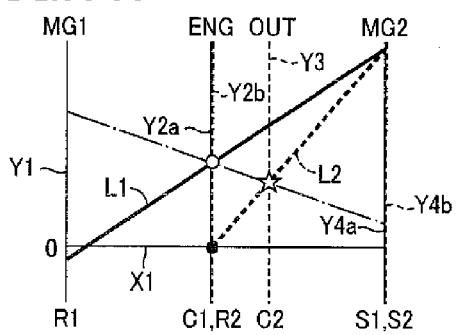
Figure 11G:
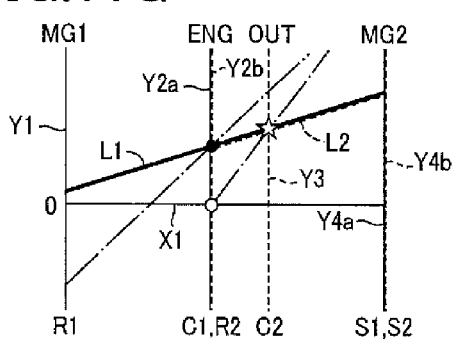
Figure 11H:
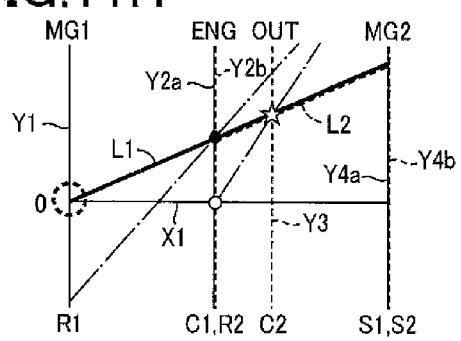

The collinear chart of FIG. 11($a$) corresponds to the output speed value indicated at (1) in FIG. 9, and represents the state of the drive system 10 placed in the hybrid drive mode HV1. In this state, the drive system 10 has the transmission efficiency value indicated at (1) in FIG. 10. When the output speed is increased from the value indicated at (1) in FIG. 9, the drive system 10 is switched from the hybrid drive mode HV1 to the hybrid drive mode HV2. The collinear chart of FIG. 11($b$) represents the state of the drive system 10 placed in the hybrid drive mode HV2 as a result of an increase of the output speed from the value indicated in FIG. 11($a$). When the output speed is further increased from the value of FIG. 11($b$), the operating speed of the second electric motor MG2 is zeroed as indicated by a broken-line circle in the collinear chart of FIG. 11($c$). In this state, the drive system 10 has the mechanical locking point indicated at (2) in FIGS. 9 and 10. In the state of FIG. 11($c$), the amount of the electric energy transmitted through the electric path between the first and second electric motors MG1 and MG2 is zero, so that the drive system 10 has the maximum transmission efficiency of 1.0.

When the output speed is increased from the value indicated at (2) in FIG. 9, the drive system 10 is switched from the hybrid drive mode HV2 to the hybrid drive mode HV1. The collinear chart of FIG. 11($d$) represents the state of the drive system 10 placed in the hybrid drive mode HV1 as a result of an increase of the output speed from the value indicated in FIG. 11($c$). When the output speed is further increased from the value of FIG. 11($d$), the operating speed of the first electric motor MG1 is zeroed as indicated by a broken-line circle in the collinear chart of FIG. 11($e$). In this state, the drive system 10 has the mechanical locking point indicated at (3) in FIGS. 9 and 10. In the state of FIG. 11($e$), the amount of the electric energy transmitted through the electric path between the first and second electric motors MG1 and MG2 is zero, so that the drive system 10 has the maximum transmission efficiency of 1.0.

The collinear chart of FIG. 11($f$) represents the state of the drive system 10 after an increase of the output speed from the value indicated in FIG. 11($e$). When the output speed is increased from this value, the drive system 10 is switched from the hybrid drive mode HV1 to the hybrid drive mode HV2. The collinear chart of FIG. 11($g$) represents the state of the drive system 10 placed in the hybrid drive mode HV2 as a result of an increase of the output speed from the value indicated in FIG. 11($f$). When the output speed is further increased from the value of FIG. 11($g$), the operating speed of the first electric motor MG1 is zeroed as indicated by a broken-line circle in the collinear chart of FIG. 11($h$). In this state, the drive system 10 has the mechanical locking point indicated at (4) in FIGS. 9 and 10. In the state of FIG. 11($h$), the amount of the electric energy transmitted through the electric path between the first and second electric motors MG1 and MG2 is zero, so that the drive system 10 has the maximum transmission efficiency of 1.0.

As described above by reference to FIGS. 9-11($h$), the drive mode switching control portion 60 according to the present embodiment is configured to alternately establish or select the two hybrid drive modes HV1 and HV2 with the increase of the output speed when the required vehicle drive force is held constant, so that the mechanical locking point at which the amount of the electric energy transmitted through the electric path between the first and second electric motors MG1 and MG2 is zero is established at three different points of time during the increase of the output speed. In other words, the drive mode switching control portion 60 permits the drive system 10 to be kept operated at a sufficiently high transmission efficiency, during a change of the speed ratio, as indicated by a thick line in FIG. 10. If the drive system 10 was placed in one of the hybrid drive modes HV1 and HV2 which is not actually established during the increase of the output speed in the manner according to the present embodiment, the mechanical locking point would not be established at all, as indicated by the thin one-dot chain lines in the collinear charts of FIGS. 11($a$)-11($h$), or the number of the mechanical locking points to be established would be smaller than that in the present embodiment.

Figure 12:
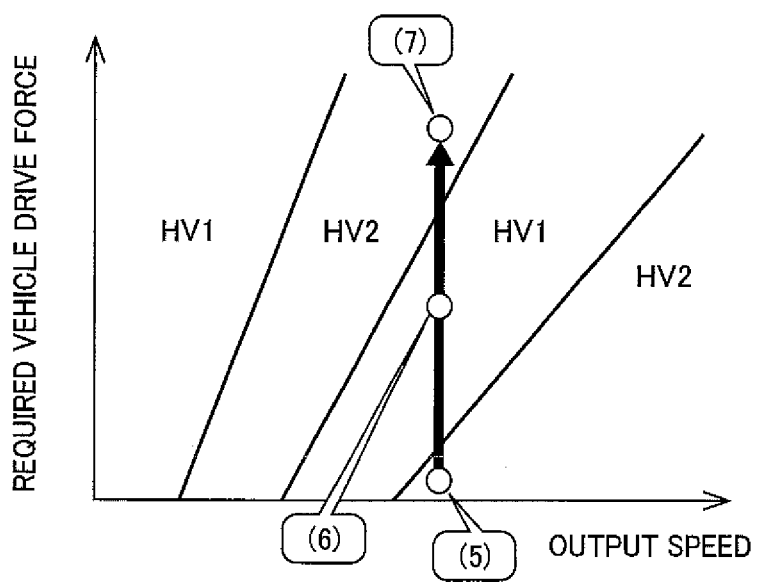
FIG. 12 is a view indicating the drive mode switching map of FIG. 9 used by the electronic control device shown in FIG. 2, where the drive system is switched between the two hybrid drive modes according to a second embodiment of the invention, with an increase of the required vehicle drive force while the output speed is held constant, as indicated by a thick arrow-headed line.

FIG. 12 is the view indicating the example of the drive mode switching map of FIG. 9 used by the drive mode switching control portion 60 according to a second embodiment of the invention, to switch the drive system 10 between the two hybrid drive modes HV1 and HV2, with an increase of the required vehicle drive force while the output speed is held constant, as indicated by a thick arrow-headed line. Namely, the drive mode switching map is formulated to establish: the hybrid drive mode HV2 when a point indicating the running state of the hybrid vehicle represented by the required vehicle drive force and the output speed lies in a first region in which the required vehicle drive force is smallest; the hybrid drive mode HV1 when the point lies in a second region in which the required vehicle drive force is larger than in the first region; and the hybrid drive mode HV2 when the point lies in a third region in which the required vehicle drive force is larger than in the second region, while the output speed is held constant, as indicated by the thick arrow-headed line in FIG. 12. Thus, the drive system 10 is alternately switched between the two hybrid drive modes HV1 and HV2, in the order of HV2, HV1, HV2, as the required vehicle drive force is increased from a value indicated at (5) toward a value indicated at (7), as indicated by the thick arrow-headed line in FIG. 12, while the output speed is held constant.

Figure 13A:
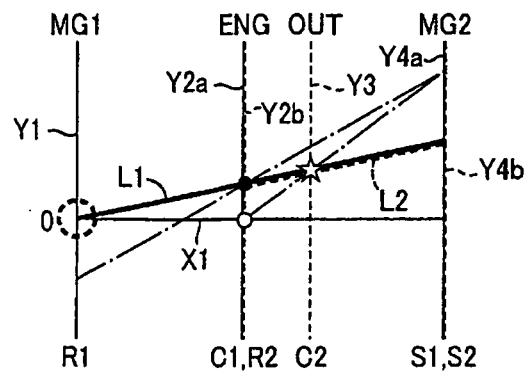
FIGS. 13(a)-13(c) are collinear charts at respective different points of time when the required vehicle drive force is increased while the output speed is held constant, as indicated by the thick arrow-headed line in FIG. 12.
Figure 13B:
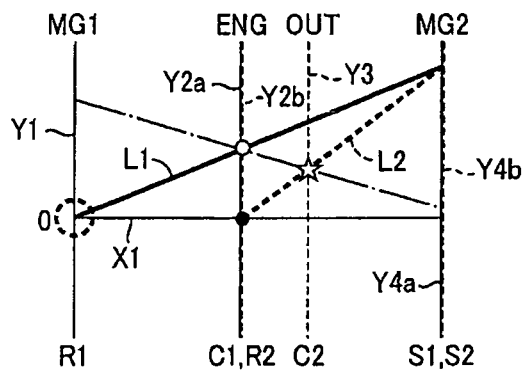

FIGS. 13(a)-13(b) are the collinear charts at respective different points of time when the required vehicle drive force is increased from the value indicated at (5) toward the value indicated at (7) while the output speed is held constant, as indicated by the thick arrow-headed line in FIG. 12. Namely, FIGS. 13(a)-13(c) correspond to the respective different values of the required vehicle drive force. The drive system 10 is alternately switched between the two hybrid drive modes HV1 and HV2 as the required vehicle drive force is increased from the value of FIG. 13(a) toward the value of FIG. 13(c).

Figure 13C:
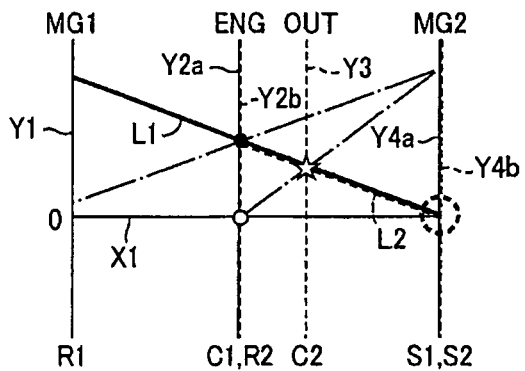

The collinear chart of FIG. 13(a) corresponds to the required vehicle drive force value indicated at (5) in FIG. 12, and represents the state of the drive system 10 placed in the hybrid drive mode HV2. In this state, the operating speed of the first electric motor MG1 is zeroed as indicated by a broken-line circle in the collinear chart of FIG. 13(a). The collinear chart of FIG. 13(b) represents the state in which the drive system 10 has been switched from the hybrid drive mode HV2 to the hybrid drive mode HV1 as a result of an increase of the required vehicle drive force from the value indicated in FIG. 13(a). In this state, the operating speed of the first electric motor MG1 is zeroed as indicated by a broken-line circle in the collinear chart of FIG. 13(b). The collinear chart of FIG. 13(c) represents the state in which the drive system 10 has been switched from the hybrid drive mode HV1 to the hybrid drive mode HV2 as a result of an increase of the required vehicle drive force from the value indicated in FIG. 13(b). In this state, the operating speed of the second electric motor MG2 is zeroed as indicated by a broken-line circle in the collinear chart of FIG. 13(c).

As described above by reference to FIGS. 12 and 13(a)-13(c) the drive mode switching control portion 60 according to the present embodiment is configured to alternately establish or select the two hybrid drive modes HV1 and HV2 with the increase of the required vehicle drive force when the output speed is held constant, so that the mechanical locking point at which the amount of the electric energy transmitted through the electric path between the first and second electric motors MG1 and MG2 is zero is established at three different points of time during the increase of the required vehicle drive force. In other words, the drive mode switching control portion 60 permits the drive system 10 to be kept operated at a sufficiently high transmission efficiency. If the drive system 10 was placed in one of the hybrid drive modes HV1 and HV2 which is not actually established during the increase of the required vehicle drive force in the manner according to the present embodiment, the mechanical locking point would not be established at all, as indicated by the thin one-dot chain lines in the collinear charts of FIGS. 13(a)-13(c) or the number of the mechanical locking points to be established would be smaller than that in the present embodiment.

Figure 14:
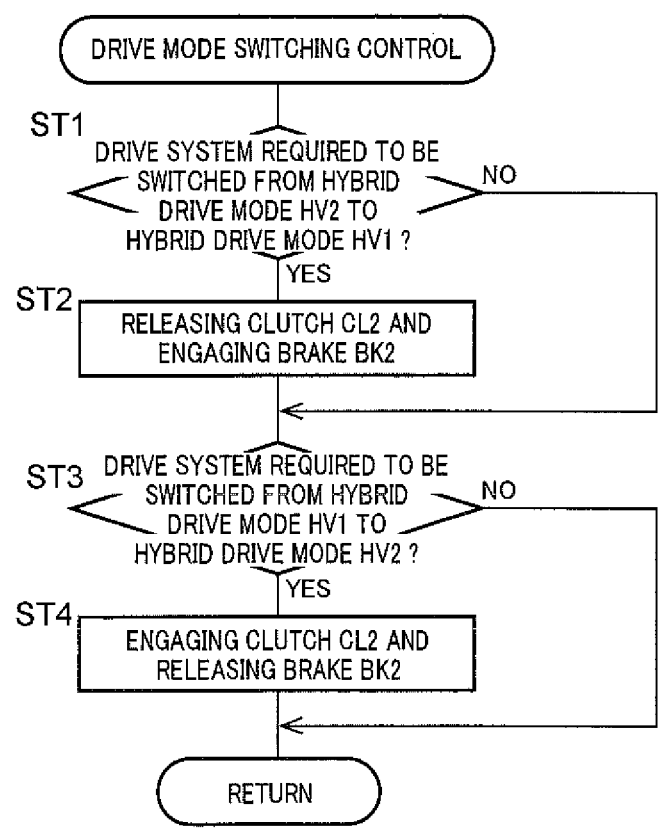
FIG. 14 is a flow chart illustrating a major portion of one example of a drive mode switching control implemented by the electronic control device shown in FIG. 2.

FIG. 14 is the flow chart illustrating a major portion of one example of the drive mode switching control implemented by the electronic control device 30. This drive mode switching control is implemented with a predetermined cycle time.

The drive mode switching control is initiated with a step ST1, to determine whether the drive system 10 is required to be switched from the hybrid drive mode HV2 to the hybrid drive mode HV1. This determination is made on the basis of the required vehicle drive force and the output speed, and according to the drive mode switching map indicated in FIG. 9 or FIG. 12. If a negative determination is obtained in the step ST1, the control flow goes to a step ST3. If an affirmative determination is obtained in the step ST1, the control flow goes to a step ST2 to release the clutch CL2 and engage the brake BK2 for switching the drive system 10 from the hybrid drive mode HV2 to the hybrid drive mode HV1. Then, the control flow goes to the step ST3 to determine whether the drive system 10 is required to be switched from the hybrid drive mode HV1 to the hybrid drive mode HV2. This determination is made also on the basis of the required vehicle drive force and the output speed, and according to the drive mode switching map indicated in FIG. 9 or FIG. 12. If a negative determination is obtained in the step ST3, the present control routine is terminated. If an affirmative determination is obtained in the step ST3, the control flow goes to step ST4 to engage the clutch CL2 and release the brake BK2 for switching the drive system 10 from the hybrid drive mode HV1 to the hybrid drive mode HV2, and the present control routine is terminated.

As described above, the drive mode switching control portion 60 according to the illustrated embodiments is configured to alternately establish or select the two hybrid drive modes HV1 and HV2 as one of the required vehicle drive force and the output speed of the drive system 10 is increased while the other is held constant. Namely, the control routine illustrated in the flow chart of FIG. 14 is executed by the drive mode switching control portion 60 such that the steps ST2 and ST4 are alternately implemented as one of the required vehicle drive force and the output speed is increased while the other of the required vehicle drive force and the output speed is held constant, that is, such that the affirmative determination is obtained alternately in the steps ST1 and ST3. In the control routine of FIG. 14, the steps ST1 and ST3 correspond to the drive mode switching control portion 60, while the steps ST2 and ST4 respectively correspond to the clutch engagement control portion 62 and the brake engagement control portion 64.

The illustrated embodiments described above are configured such that the electronic control device 30 controls the drive system 10 which is configured such that the transmission efficiency of the drive system 10 which varies with a change of its speed ratio has the maximal value at the first and second speed ratio values γb and γc, in one of the two hybrid drive modes HV1 and HV2, and at the third speed ratio value γa intermediate between the first and second speed ratio values γb and γc, in the other of the two hybrid drive modes HV1 and HV2, and the drive mode switching control portion 60 is configured to switch the drive system 10 to the selected one of the two hybrid drive modes HV1 and HV2 on the basis of the predetermined control parameter (the output speed or the required vehicle drive force) such that the two hybrid drive modes HV1 and HV2 are selectively established as the predetermined control parameter is increased. Accordingly, the hybrid vehicle drive system has a relatively large number of mechanical locking points during the increase of the predetermined control parameter. Namely, the illustrated embodiments provide a control apparatus in the form of the electronic control device 30 for the hybrid vehicle drive system 10, which control apparatus permits an effective or significant improvement of the transmission efficiency of the hybrid vehicle drive system 10.

The illustrated embodiments are further configured such that the drive mode switching control portion 60 alternately establishes the two hybrid drive modes HV1 and HV2 as one of the required vehicle drive force and the output speed of the hybrid vehicle drive system is increased while the other of the required vehicle drive force and the output speed is held constant. Accordingly, the hybrid vehicle drive system 10 has a relatively large number of mechanical locking points during the increase of one of the two control parameters in the form of the required vehicle drive force and the output speed which can be practically used to switch the drive system between the hybrid drive modes HV1 and HV2, so that the transmission efficiency of the drive system can be effectively or significantly improved.

Further, the drive system 10 to be controlled by the electronic control device 30 according to the illustrated embodiments is configured such that the relative rotating speeds of the four rotary components of the differential device constituted by the first and second planetary gear sets 14 and 16 are represented by the collinear chart in which the vertical line representing the rotating speed of the rotary component R1 which is fixed to the first electric motor MG1, and the vertical line representing the rotating speed of the rotary component S1, S2 which is fixed to the second electric motor MG2 are located at the respective opposite ends of the collinear chart in the direction perpendicular to the vertical lines. Accordingly, the drive system 10 which has a practical arrangement has a relatively large number of mechanical locking points while the drive system 10 is alternately switched between the hybrid drive modes HV1 and HV2, so that the transmission efficiency of the drive system 10 can be effectively or significantly improved.

Further, the drive system 10 to be controlled by the electronic control device 30 according to the illustrated embodiments is configured such that its transmission efficiency has the maximal value when the operating speed of the first electric motor MG1 or the second electric motor MG2 is zero. Accordingly, the drive system 10 has a relatively large number of mechanical locking points while the drive system 10 is alternately switched between the two hybrid drive modes HV1 and HV2, so that the transmission efficiency of the drive system 10 can be effectively or significantly improved.

The drive system 10 to be controlled by the electronic control device 30 according to the illustrated embodiments is further configured such that the first differential mechanism in the form of the first planetary gear set 14 has a first rotary element in the form of the ring gear R1 fixed to the first electric motor MG1, a second rotary element in the form of the carrier C1 fixed to the above-described engine 12, and a third rotary element in the form of the sun gear S1, while the second differential mechanism in the form of the second planetary gear set 16 has a first rotary element in the form of the ring gear R2, a second rotary element in the form of the carrier C2 and a third rotary element in the form of the sun gear S2. Further, the sun gear S1 of the first planetary gear set 14 and the sun gear S2 of the second planetary gear set 16 are fixed to each other, and the carrier C2 of the second planetary gear set 16 is fixed to the output rotary member in the form of the output gear 28, while the sun gear S2 of the second planetary gear set 16 is fixed to the second electric motor MG2. Further, the clutch CL2 selectively connects the carrier C1 of the first planetary gear set 14 and the ring gear R2 of the second planetary gear set 16, while the brake BK2 selectively fixes the ring gear R2 of the second planetary gear set 16 to the stationary member in the form of the housing 26. Accordingly, the drive system 10 which has a practical arrangement has a relatively large number of mechanical locking points while the drive system 10 is alternately switched between the two hybrid drive modes HV1 and HV2, so that the transmission efficiency of the drive system 10 can be effectively or significantly improved.

While the preferred embodiments of this invention have been described by reference to the drawings, it is to be understood that the invention is not limited to the details of the illustrated embodiments, but may be embodied with various changes which may occur without departing from the spirit of the invention.

NOMENCLATURE OF REFERENCE SIGNS

10: Hybrid vehicle drive system
12: Engine
14: First planetary gear set (First differential mechanism)
16: Second planetary gear set (Second differential mechanism)
26: Housing (Stationary member)
28: Output gear (Output rotary member)
30: Electronic control device
BK2: Brake
C1: Carrier (Second rotary element)
C2: Carrier (Second rotary element)
CL2: Clutch
MG1: First electric motor
MG2: Second electric motor
R1: Ring gear (First rotary element)
R2: Ring gear (First rotary element)
S1: Sun gear (Third rotary element)
S2: Sun gear (Third rotary element)
γa: Third speed ratio value
γb: First speed ratio value
γc: Second speed ratio value

The invention claimed is:

1. A control apparatus for a hybrid vehicle drive system including: a differential device which comprises a first differential mechanism and a second differential mechanism and which comprises four rotary components; and an engine, a first electric motor, a second electric motor and an output rotary member which are respectively connected to said four rotary components, and wherein one of said four rotary components is constituted by a rotary element of said first differential mechanism and a rotary element of said second differential mechanism which are selectively connected to each other through a clutch, while one of said rotary elements of said first and second differential mechanisms is selectively connected to a stationary member through a brake, said control apparatus comprising a drive mode switching control portion for switching the hybrid vehicle drive system to a selected one of at least two hybrid drive modes according to a selected one of respective different combinations of operating states of said clutch and said brake:

said control apparatus being configured to control said hybrid vehicle drive system such that a transmission efficiency of the hybrid vehicle drive system which varies with a change of its speed ratio has a maximal value at a first speed ratio value and a second speed ratio value, in one of said at least two hybrid drive modes, and at a third speed ratio value intermediate between said first and second speed ratio values, in the other of said at least two hybrid drive modes; and said drive mode switching control portion being configured to switch said hybrid vehicle drive system to a selected one of said at least two hybrid drive modes on the basis of a predetermined control parameter such that said two hybrid drive modes are selectively established as said predetermined control parameter is increased.

2. The control apparatus according to claim 1, wherein said drive mode switching control portion alternately establishes said two hybrid drive modes as one of a required vehicle drive force and an output speed of the hybrid vehicle drive mode is increased as said predetermined control parameter while the other of said required vehicle drive force and said output speed is held constant.

3. The control apparatus according to claim 1, wherein said hybrid vehicle drive system is configured such that relative rotating speeds of said four rotary components are represented by a collinear chart in which a vertical line representing a rotating speed of the rotary component fixed to said first electric motor, and a vertical line representing a rotating speed of the rotary component fixed to the second electric motor are located at respective opposite ends of the collinear chart in a direction perpendicular to said vertical lines.

4. The control apparatus according to claim 1, wherein the transmission efficiency of said hybrid vehicle drive system has said maximal value when an operating speed of said first electric motor or said second electric motor is zero.

5. The control apparatus according to claim 1, wherein said first differential mechanism comprises a first rotary element connected to said first electric motor, a second rotary element connected to said engine, and a third rotary element, while said second differential mechanism comprises a first rotary element, a second rotary element and a third rotary element, and wherein said third rotary element of said first differential mechanism and said third rotary element of said second differential mechanism are fixed to each other, and said second rotary element of said second differential mechanism is fixed to said output rotary member, while said third rotary element of said second differential mechanism is fixed to said second electric motor, and wherein said clutch selectively connects said second rotary element of said first differential mechanism and said first rotary element of said second differential mechanism, while said brake selectively fixes said first rotary element of said second differential mechanism to said stationary member.

\* \* \* \* \*